(12) United States Patent
Walschap et al.

(10) Patent No.: US 8,059,173 B2
(45) Date of Patent: Nov. 15, 2011

(54) CORRELATED DOUBLE SAMPLING PIXEL AND METHOD

(75) Inventors: Tom Walschap, Bornem (BE); Yannick De Wit, Wilrijk (BE)

(73) Assignee: On Semiconductor Trading Ltd., Hamilton (BM)

( * ) Notice: Subject to any disclaimer, the term of this patent is extended or adjusted under 35 U.S.C. 154(b) by 495 days.

(21) Appl. No.: 12/284,901

(22) Filed: Sep. 26, 2008

(65) Prior Publication Data

US 2010/0079632 A1   Apr. 1, 2010

(51) Int. Cl.
*H04N 5/217* (2011.01)
(52) U.S. Cl. ....................................................... 348/241
(58) Field of Classification Search .................. 348/241, 348/243, 250
See application file for complete search history.

(56) References Cited

U.S. PATENT DOCUMENTS

| | | | |
|---|---|---|---|
| 5,128,534 A | 7/1992 | Wyles et al. | |
| 5,461,425 A | 10/1995 | Fowler et al. | |
| 5,668,375 A * | 9/1997 | Petrick et al. | 250/370.09 |
| 5,909,026 A * | 6/1999 | Zhou et al. | 250/208.1 |
| 5,990,948 A * | 11/1999 | Sugiki | 348/250 |
| 6,057,539 A * | 5/2000 | Zhou et al. | 250/208.1 |
| 6,166,367 A * | 12/2000 | Cho | 250/208.1 |
| 6,225,670 B1 | 5/2001 | Dierickx | |
| 6,545,303 B1 | 4/2003 | Scheffer | |
| 6,787,749 B1 * | 9/2004 | Zhou et al. | 250/208.1 |
| 6,812,539 B1 | 11/2004 | Rhodes | |
| 6,836,291 B1 * | 12/2004 | Nakamura et al. | 348/301 |
| 7,106,915 B2 | 9/2006 | Dierickx | |
| 7,113,213 B2 * | 9/2006 | Matsunaga et al. | 348/308 |
| 7,224,389 B2 * | 5/2007 | Dierickx | 348/308 |
| 7,289,148 B1 | 10/2007 | Dierickx | |
| 7,379,109 B2 * | 5/2008 | Masuyama et al. | 348/308 |
| 7,385,166 B2 * | 6/2008 | Fossum | 250/208.1 |
| 7,397,506 B2 * | 7/2008 | Bell et al. | 348/243 |

(Continued)

FOREIGN PATENT DOCUMENTS

WO   WO 99/30368   6/1999

OTHER PUBLICATIONS

Orly Yadid-Pecht et al., "A Random Access Photodiode Array for Intelligent Image Capture", IEEE Transactions on Electron Devices, vol. 38, No. 8, Aug. 1991, pp. 1772-1780.

(Continued)

*Primary Examiner* — Nicholas Giles
(74) *Attorney, Agent, or Firm* — Rennie William Dover

(57) ABSTRACT

A correlated double sampling (CDS) pixel and methods of operating the same are provided. The CDS pixel includes a sensor circuit to generate a voltage value corresponding to electromagnetic radiation received on a photodetector included therein, and a sample and hold (S/H) stage including a sample switching-element and first and second capacitor-elements. The first capacitor-element is coupled between an output of the sensor circuit through the sample switching-element and a predetermined reference potential. The second capacitor-element has a first node coupled to the output of the sensor circuit through the sample switching-element and a second node coupled in series with an output of the S/H stage, the second node of the second capacitor-element further coupled through a calibration switching-element to a calibration voltage to sample a reset voltage value on the photodetector at a first time at a beginning of an integration period following reset of the sensor circuit.

20 Claims, 7 Drawing Sheets

U.S. PATENT DOCUMENTS

| | | | |
|---|---|---|---|
| 7,408,443 B2 | 8/2008 | Nam | |
| 7,479,994 B2 * | 1/2009 | Yang et al. | 348/241 |
| 7,479,995 B2 * | 1/2009 | Dosluoglu | 348/241 |
| 7,515,183 B2 * | 4/2009 | Yang et al. | 348/241 |
| 7,548,261 B2 * | 6/2009 | Yang et al. | 348/241 |
| 7,595,827 B2 * | 9/2009 | Sato | 348/296 |
| 7,626,622 B2 * | 12/2009 | Kasuga et al. | 348/300 |
| 7,701,493 B2 * | 4/2010 | Mauritzson | 348/241 |
| 7,825,967 B2 * | 11/2010 | Panicacci | 348/257 |
| 7,852,385 B2 * | 12/2010 | Mauritzson | 348/241 |
| 2003/0011694 A1 * | 1/2003 | Dierickx | 348/308 |
| 2003/0011829 A1 | 1/2003 | Dierickx | |
| 2004/0212704 A1 * | 10/2004 | Bell et al. | 348/241 |
| 2004/0235215 A1 | 11/2004 | Komori | |
| 2005/0088553 A1 | 4/2005 | Kuwazawa | |
| 2005/0092895 A1 * | 5/2005 | Fossum | 250/208.1 |
| 2005/0099517 A1 | 5/2005 | Kuwazawa | |
| 2005/0270394 A1 | 12/2005 | Dierickx | |
| 2008/0018763 A1 * | 1/2008 | Sato | 348/308 |
| 2008/0218620 A1 * | 9/2008 | Atlas et al. | 348/308 |
| 2008/0259195 A1 * | 10/2008 | Yoshida et al. | 348/308 |
| 2008/0297627 A1 * | 12/2008 | Matsuda | 348/243 |
| 2009/0021619 A1 * | 1/2009 | Kasuga et al. | 348/300 |
| 2010/0020213 A1 * | 1/2010 | Mauritzson | 348/294 |

OTHER PUBLICATIONS

J. Bogaets et al., "High-end CMOS Active Pixel Sensor for Hyperspectral Imaging", 2005 IEEE Workshop on Charge Coupled Devices and Advanced Image Sensors, R11, pp. 39-43.

Herman Witters, et al., "1024×1028 pixel dual shutter APS for industrial Vision" Proceedings of SPIE-IS&T Electronic Imaging, Camera Systems, SPIE vol. 5017 (2003), pp. 19-23.

Recontres de Technologies Spatiales, Systemes Imageurs A Haute Resolution (OT1), Development d'un demonstrateur de detecteur APS, Toulouse 5 & 6 Oct. 2006 pp. 1-16.

Bart Dierickx et al., "NIR-enhanced image sensor using multiple epitaxial layer" Proceedings of SPIE-IS&T Electronic Imaging, SPIE vol. 5301 (2004), pp. 205-212.

\* cited by examiner

CORRELATED DOUBLE SAMPLING PIXEL AND METHOD

TECHNICAL FIELD

The present disclosure relates generally to image sensors and more particularly to a correlated double sampling pixel and methods of operating the same.

BACKGROUND

A design criterion in image sensors includes dynamic range, which is defined as a logarithmic ratio between the full scale voltage swing on the photodetector and the smallest detectable variation in photodiode output. Generally, the smallest detectable variation is dominated by reset sampling noise of the photodetector.

SUMMARY

A correlated double sampling pixel and method of operating the same are provided. In one embodiment, the pixel includes a sensor circuit to generate a voltage value corresponding to electromagnetic radiation received on a photodetector included therein, and a sample and hold (S/H) stage including a sample switching-element and first and second capacitor-elements. The first capacitor-element is coupled between an output of the sensor circuit through the sample switching-element and a predetermined reference potential. The second capacitor-element has a first node coupled to the output of the sensor circuit through the sample switching-element and a second node coupled in series with an output of the S/H stage, the second node of the second capacitor-element further coupled through a calibration switching-element to a calibration voltage to sample a reset voltage value on the photodetector at a first time at a beginning of an integration period following reset of the sensor circuit.

BRIEF DESCRIPTION OF THE DRAWINGS

These and various other features of the interface device and methods for using the same will be apparent upon reading of the following detailed description in conjunction with the accompanying drawings and the appended claims provided below, where:

DETAILED DESCRIPTION

Figure 1:
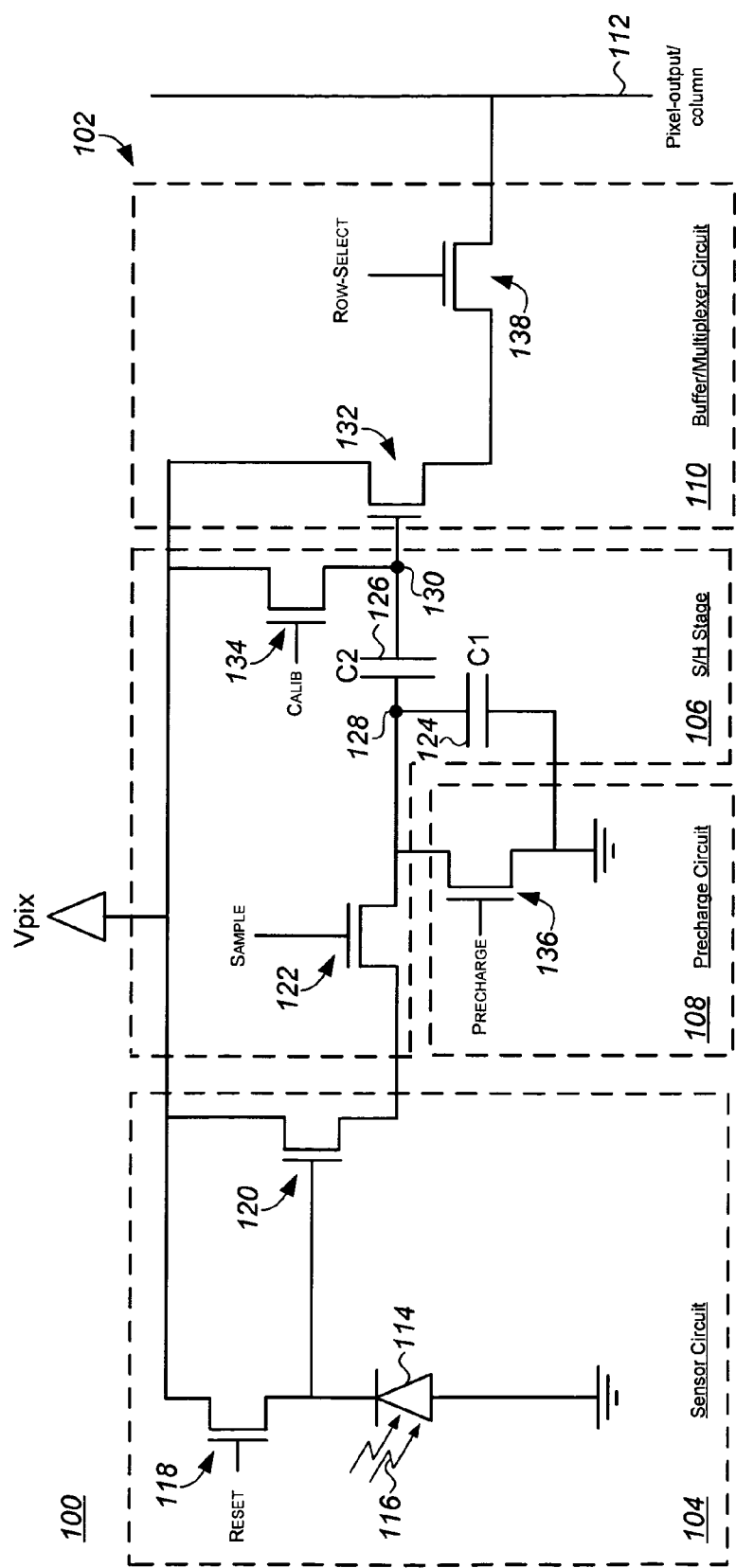
FIG. 1 is a simplified schematic diagram of a portion of an image sensor including a correlated double sampling (CDS) pixel according to one embodiment.

The drawings described are only schematic and are non-limiting. In the drawings, the size of some of the elements may be exaggerated and not drawn to scale for illustrative purposes. The dimensions and the relative dimensions may not correspond to actual reductions to practice of the invention. For purposes of clarity, many of the details of image sensors in general and to image sensors including arrays of active pixels in particular, which are widely known and not relevant to the present control system and method have been omitted from the following description.

Correlated double sampling (CDS) may be used to reduce the impact of reset sampling noise on dynamic range. CDS includes a technique of taking two samples of a signal out of the pixel and subtracting the first from the second to remove reset sampling noise. Generally, the sampling is performed once immediately following reset of the photodetector and once after the photodetector has been allowed to accumulate a charge due to change in lighting.

A simplified schematic diagram of a portion of an image sensor 100 including an embodiment of a single, correlated double sampling (CDS) pixel 102 is shown in FIG. 1. The CDS pixel 102 includes a sensor circuit 104 to generate signals in response to electromagnetic radiation (light); a sample and hold (S/H) stage 106 to read-out or sample and store the signals; a precharge circuit 108 to precharge storage elements in the S/H stage; and a buffer/multiplexer circuit 110 to couple an output node of the S/H stage to a pixel output/column 112. The CDS pixel 102 is generally one of multiple pixels in an array of pixels (not shown) arranged in multiple rows and multiple columns, pixel outputs from each column of the multiple rows of pixels coupled to shared column 112 to enable a pipelined or sequential readout of each row of pixels in the array. The array of pixels is formed in a layer of semiconductor material on a common, shared wafer or substrate (not shown), which may include other elements and circuits of the image sensor.

Referring to FIG. 1, the sensor circuit 104 includes a three transistor (3T)—like pixel front-end, which includes a photosensor or photodetector 114 to generate a signal in response to electromagnetic radiation 116 (light) received thereon. The photodetector 114 can include one or more photodiodes, phototransistors, photoresistors or charge-coupled devices (CCDs), which generate a change in current, voltage or a charge in response to incident electromagnetic radiation on the photodetector. In the embodiment shown, the photodetector 114 includes a reverse-biased photodiode (PD) coupled between a positive pixel voltage supply (Vpix) and ground. When exposed to electromagnetic radiation 116 the semiconductor material of which the PD 114 is fabricated photogenerates charge carriers, e.g. electrons, in proportion to the energy of electromagnetic radiation 116 received and to a time or integration period over which the PD is exposed to the electromagnetic radiation to generate a current (photocurrent) through the PD. A reset switching-element or transistor 118 periodically resets the PD 114 to a fixed bias, clearing all accumulated charge on the photodetector due to photogenerated carriers at the beginning of every integration period. The sensor circuit 104 further includes to a readout switching-element or transistor, such as a source follower amplifier (SF 120), having a drain connected or coupled to Vpix, a source coupled to an input of the S/H stage 106, and a control node or gate coupled to the PD 114. The SF 120 generates a voltage signal or value corresponding to the charge accumulated on the PD 114, and acts as a buffer to enable the charge on the PD to be sampled or measured substantially without altering or removing the accumulated charge.

The S/H stage 106 samples and holds or stores voltage signals from the sensor circuit 104, and includes a sample switching-element or transistor 122 electrically connected or coupled to the source of the SF 120 to couple voltage signals (less a threshold voltage ($V_T$) of the SF) from the sensor circuit 104 to storage elements, such as capacitor-elements C1 124 and C2 126 connected in serial and in parallel with an output of the S/H stage 106. More specifically, C2 126 is serially coupled between an input and output of the S/H stage having a first or left-hand node (node 128) coupled to an output of the sample transistor 122 and a second or right hand node (node 130) coupled to a readout switching-element or transistor, such as a second source follower amplifier (SF 132), in the buffer/multiplexer circuit 110.

The second or right hand node (node 130) of C2 126 is further coupled to a calibration switching-element or transistor 134 to couple C2 126 to a predetermined, high DC calibration voltage (Vcalib) to enable C2 to sample a reset value or signal of the PD 114 following reset of the sensor circuit 104. As explained in greater detail below, Vcalib is selected to be within an order of magnitude of the expected reset value to be sure the full swing is maintained during subtraction (sampling). In the embodiments shown in FIG. 1, the calibration transistor 134 is coupled to Vpix so that Vcalib is equal to Vpix. However, it will be understood that this need not be the case, and that in other embodiments, such as those described in FIGS. 7 and 8 below, the calibration transistor can instead be coupled to other nodes having another predetermined, high DC voltage (Vcalib).

Capacitor-element C1 124 is also coupled to the output of the sample transistor 122 at node 128 and through a second node (not labeled) to a predetermined reference voltage. In FIG. 1 the second node of C1 124 is shown as being coupled in parallel with a precharge switching-element or transistor 136 to ground tap or line in the pixel 102. However, it will be understood by those skilled in the art, that this need not be the case, and that the second node of C1 124 can alternatively be electrically coupled to any fixed voltage sufficiently below the positive pixel voltage supply (Vpix) to enable SF 120 to conduct, thereby ensuring a signal voltage or value from the sensor circuit 104 can be stored on C1. It will further be understood that in still other embodiments, as described in detail below, C1 124 need not be coupled in parallel with the precharge transistor 136, but can instead be separately coupled to a predetermined reference voltage or to electrical ground independently of the precharge transistor.

Although capacitor-elements C1 124 and C2 126 can both include independent, discrete capacitors, as shown schematically in FIG. 1, alternatively the physical and electrical sizes of capacitor-element C1 124 can be reduced, or a discrete capacitor eliminated entirely, by utilizing intrinsic capacitance formed between a plate of capacitor C2 126 coupled to node 128 and an electrical ground of the common substrate (not shown). It will be appreciated Reducing the size of or eliminating C1 124 significantly reduces an area in the pixel 102 occupied by non-light sensitive elements, and reducing the pitch or spacing between centers of the pixels, thereby improving fill factors of both the pixel and image sensor 100, as compared to conventional eight transistor (8T) CDS pixels. By fill factor it is meant a ratio of the area of photosensitive elements in the CDS pixel 102 or an array of pixels to a total area of the pixel or array. It will further be appreciated that increasing the fill factor also significantly increases the signal-to-noise (SNR) of the image sensor 100 as the SNR is directly related to the product of fill factor and quantum efficiency.

As noted above, the in-pixel precharge circuit 108 includes the precharge transistor 136 coupled to capacitor-elements C1 124 and C2 126 at node 128 to precharge C1 and C2 to a predetermined, precharge voltage prior to sampling a signal value from the sensor circuit 104. Precharging is desirable as the S/H stage 106 is driven by a simple source follower (SF 120) and, if a previous sampled value is higher or within a threshold voltage ($V_T$) of the SF ($V_{T\_SF1}$) of the next sampled value, the SF will cut off and no sampling will take place. Thus, without precharging or clearing the capacitor-elements C1 124 and C2 126 in the S/H stage 106 the image sensed will rise to a black or blank image over time. Another reason for precharging capacitor-elements C1 124 and C2 126 is to help reduce image lag, that is a persistence or incomplete erasure of a previously sampled value that could lead to errors in imaging.

As noted above, the pixel 102 further includes a multiplexer or buffer/multiplexer circuit 110 to couple an output node of the S/H stage 106 to a pixel output or column 112. In the embodiment shown in FIG. 1 the buffer/multiplexer circuit 110 includes a source follower (SF) amplifier 132 that acts as a buffer and has a drain connected or coupled to Vpix and a source coupled to the column 112 through a row-select switching-element or transistor 138. For reading, a ROW-SELECT signal is applied to a control node or gate of the row-select transistor causing it to conduct and to transfer a voltage at a source of the second SF amplifier 132 to the column 112.

Although the sensor circuit 104 and buffer/multiplexer circuit 110 are shown as including source followers amplifiers (SF 120, 132), which serve as buffers it will be appreciated that other amplifier configurations can also be used. It will further by appreciated that SF 120 and SF 132, can be included in separate buffer stages (not shown) located between the sensor circuit 104 and S/H stage 106, and/or between the S/H stage and buffer/multiplexer circuit 110.

An embodiment of a method for operating the CDS pixel 102 will now be described with reference to FIG. 1, the timing diagram of FIG. 2 and the flowchart of FIG. 3. Briefly, the principle of operation includes a phase during which a reset value of a voltage on the photodetector (PD 114) is sampled shortly after reset of the PD, and a second phase during which a signal value of the voltage on the PD 114 is sampled after the PD has been allowed to integrate charge photogenerated by electromagnetic radiation 116 (light) received thereon.

Figure 2:
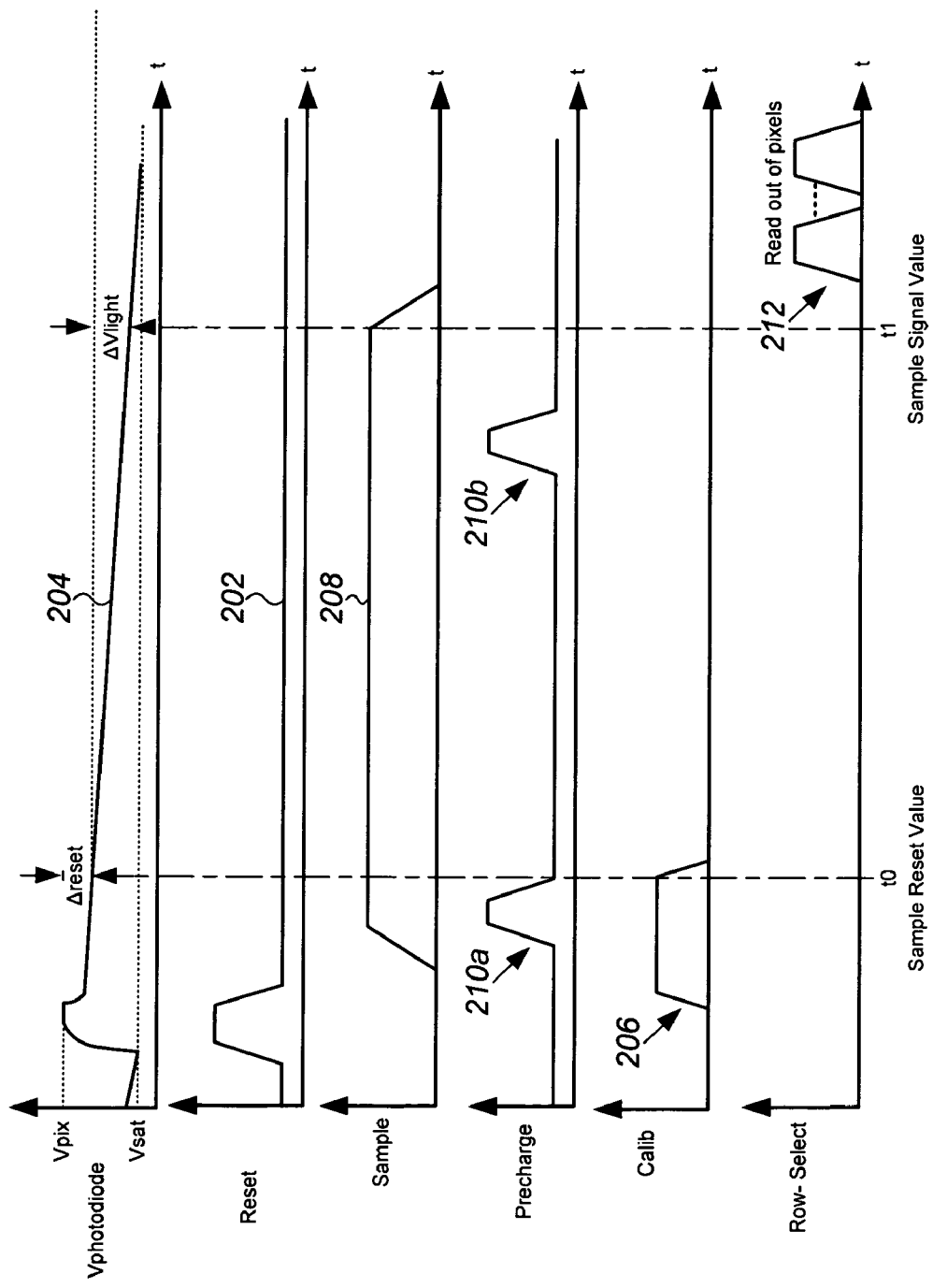
FIG. 2 is a timing chart of signals for an embodiment of a method for operating the CDS pixel of FIG. 1.
Figure 3:
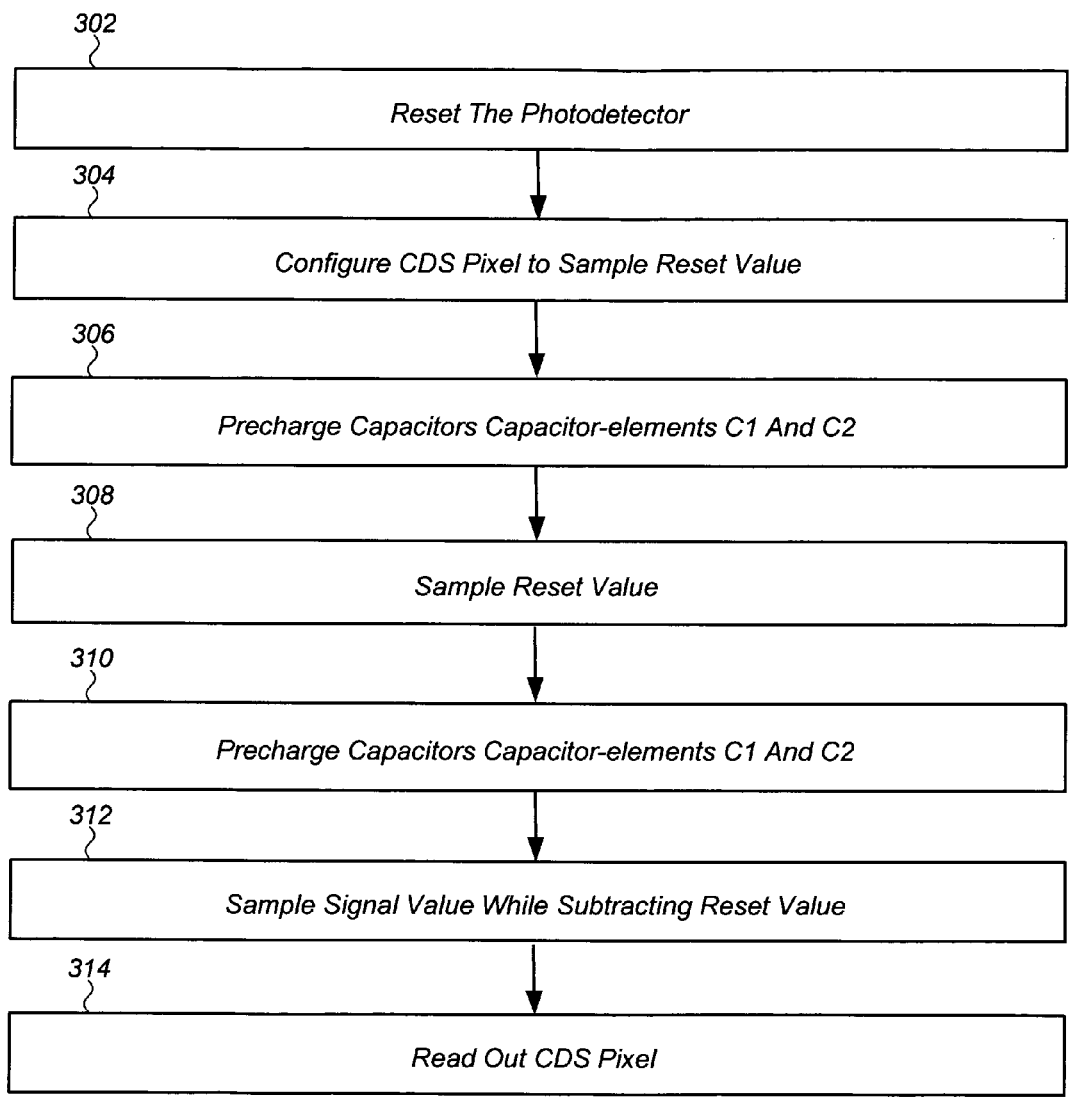
FIG. 3 is a flowchart illustrating an embodiment of a method for operating the CDS pixel of FIG. 1.

Referring to FIGS. 2 and 3, in a first block (block 302) the first phase begins with application of a RESET signal or pulse (Vreset 202) for a brief, predetermined period of time to the gate of the reset transistor 118 to clear any charge accumulated on the photodetector (PD 114) and reset the photodiode voltage (Vphotodiode 204) to Vpix. After the RESET signal is removed Vphotodiode 204 decreases from Vpix by a voltage value shown in FIG. 2 as Δreset, due to gate-source crosstalk of the reset transistor 118 and the reset sampling noise also known as the KTC noise of the photodetector (PD 114). The reset sampling noise or KTC of the PD 114 depends on the capacitance of the photodetector (PD 114), which is expressed in the voltage domain as shown in the following equation:

$$V_{noise\_pd\_rms} = \sqrt{\frac{K \cdot T}{C}} \quad \text{(Eq. 1)}$$

where K is Boltzmann's constant (~1.38e-23) in joules per Kelvin, T is the diode's absolute temperature in degrees Kelvin, and C is the capacitance of the PD 114.

Figure 4:
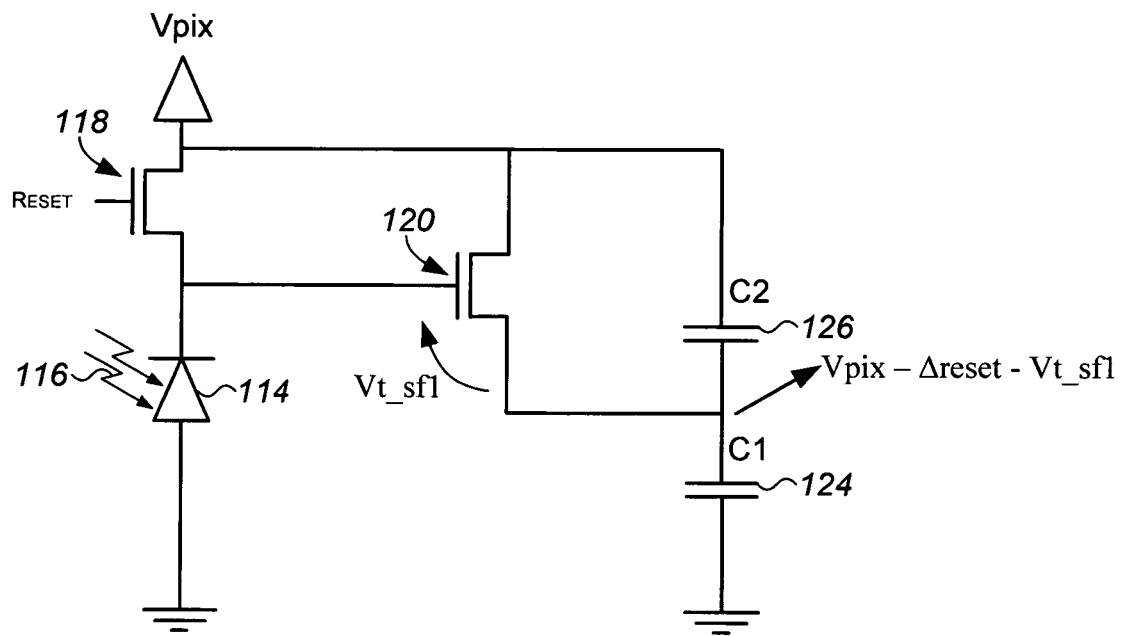
FIG. 4 is a simplified schematic diagram illustrating an embodiment of a configuration of the CDS pixel of FIG. 1 prior to sampling of the reset value.

After resetting the PD 114, in a second block (block 304) the circuit of FIG. 1 is configured in preparation for sampling the reset value by applying a C$_{ALIB}$ signal or pulse (Calib 206) to the gate of the calibration transistor 134 to couple node 130 to (Vpix), applying a S$_{AMPLE}$ signal or pulse (Sample 208) to the gate of the sampling transistor 122, and, briefly, applying a P$_{RECHARGE}$ signal or pulse (Precharge 210$a$) to the gate of the precharge transistor 136 to precharge capacitor-elements C1 124 and C2 126 (block 306). A simplified schematic diagram illustrating an embodiment of the configuration of the CDS pixel 102 of FIG. 1 prior to sampling of the reset value is shown in FIG. 4.

As noted above with respect to FIG. 1, Vcalib is selected to be within an order of magnitude of the expected reset value (Vpix - Δreset), i.e., within the Vt of first SF 120, to ensure that the SF conducts. In the embodiments shown in FIGS. 1 and 4, Vpix is selected as Vcalib, however it will be understood that the calibration transistor 134 can instead be coupled to any other node having a predetermined, high DC voltage (Vcalib).

Figure 5:
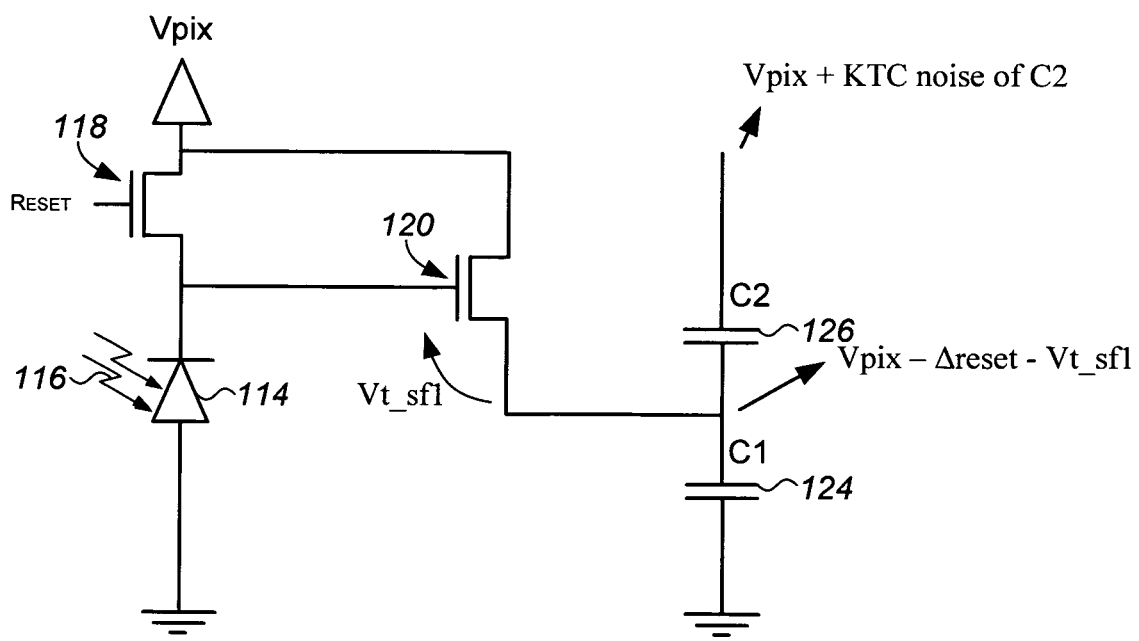
FIG. 5 is a simplified schematic diagram illustrating an embodiment of a configuration of the CDS pixel of FIG. 1 during sampling of the reset value.

After capacitor-elements C1 124 and C2 126 been precharged, the reset value of the voltage on the PD 114 is sampled at a first time ($t_0$) (block 308). In one embodiment, the sampling of the reset value is accomplished on the trailing edge of the C$_{ALIB}$ signal or pulse (Calib 206) signal when the calibration transistor 134 is going off or opening. A simplified schematic diagram illustrating an embodiment of the configuration of the CDS pixel 102 of FIG. 1 during sampling of the reset value is shown in FIG. 5.

The charges (Q) sampled or stored on C1 124 and on C2 126 following sampling of the reset values is as follows:

$$Q_{reset\_c2} = C2 \cdot ((V\text{pix} - \Delta\text{reset} - Vt\_sf1) - V\text{pix}) = C2 \cdot ("\Delta\text{reset} - Vt\_sf1) \quad \text{(Eq. 2)}$$

and $$Q_{reset\_c1} = C1 \cdot ((V\text{pix} - \Delta\text{reset} - Vt\_sf1)) \quad \text{(Eq. 3)}$$

where C1 is the capacitance of C1 124, C2 is the capacitance of C2 126, Vpix is the pixel high voltage, reset is the decrease in PD 114 reset voltage following reset due to gate-source crosstalk and KTC noise of the PD, and Vt_sf1 is the threshold voltage of the first source follower SF 120).

As indicated by the S$_{AMPLE}$ signal 208 of FIG. 2 and the simplified schematic of FIG. 5, the sampling transistor 122 continues to conduct while the calibration transistor 134 is going off to prevent introduction of KTC noise of C1 124 on node 128 in addition to the KTC noise of C2 126 on node 130. More preferably, as shown in FIG. 2 the sampling transistor 122 continues to conduct throughout substantially the entire integration period.

Next, during the signal sampling phase the value of the voltage on the PD 114 is sampled after the PD has been allowed to integrate charge photogenerated by electromagnetic radiation 116 (light) received thereon. At the same time the signal value is sampled, the reset value sampled in the previous stage is subtracted from the signal value to store on C2 126 final output value or voltage for the pixel the change in voltage on the PD 114 due to light and the calibration voltage (Vcalib. It will be appreciated that because the subtraction is accomplished within the CDS pixel 102, without the need for additional amplifier-elements that the CDS pixel of the present invention as well as any image sensor made therewith can provide substantially improved fill factors and efficiency over conventional CDS pixels. It will further be appreciated that because subtraction is accomplished substantially simultaneously with the sampling of the signal value, there is substantially no reduction in readout speed as compared to a conventional non-CDS pixel.

Figure 6:
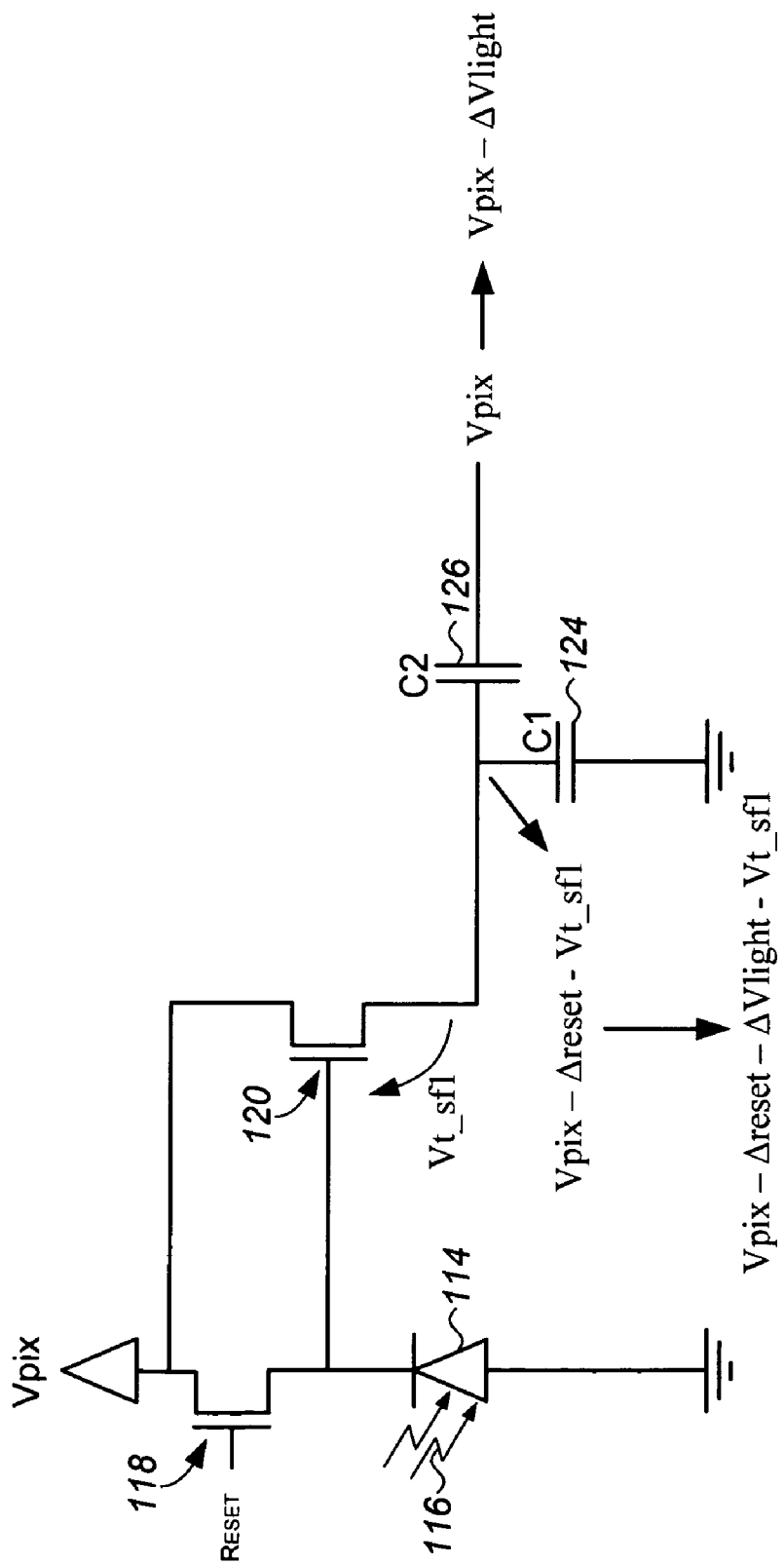
FIG. 6 is a simplified schematic diagram illustrating an embodiment of a configuration of the CDS pixel of FIG. 1 during sampling of the signal value.

Referring to FIGS. 2 and 3, the circuit of FIG. 1 is configured to sample the signal value by briefly applying a P$_{RE\text{-}CHARGE}$ signal or pulse (Precharge 210$b$) to the gate of the precharge transistor 136 to precharge capacitor-elements C1 124 and C2 126 (block 310). Thereafter the sample signal (Sample 208) to the sampling transistor 122 is removed at a second time ($t_1$) to sample the signal value and subtract the reset value sampled in the previous stage from the signal value stored on C2 126 (block 312). In one embodiment, the sampling of the reset value is accomplished on the trailing edge of the C$_{ALIB}$ signal or pulse (Calib 206) signal when the calibration transistor 134 is going off or opening. A simplified schematic diagram illustrating an embodiment of the configuration of the CDS pixel 102 of FIG. 1 during sampling of the signal value is shown in FIG. 6.

The charges or values stored on capacitor-elements C1 124 and C2 126 following the sampling of the signal value and the subtraction of the reset value are as follows:

$$Q_{signal\_c2} = C \cdot ((V\text{pix} - \Delta\text{reset} - \Delta V\text{light} - Vt\_sf1) - Vy) \quad \text{(Eq. 4)}$$

and $$Q_{signal\_c1} = C \cdot ((V\text{pix} - \Delta\text{reset} - \Delta V\text{light} - Vt\_sf1)) \quad \text{(Eq. 5)}$$

where C1 is the capacitance of C1 124, C2 is the capacitance of C2 126, Vpix is the pixel high voltage, reset is the decrease in PD 114 reset voltage following reset due to gate-source crosstalk and KTC noise of the PD, ΔVlight is the decrease in PD 114 voltage following integration due to light incident on the PD, Vt_sf1 is the threshold voltage of the first source follower SF 120) and Vy is the output voltage at node 130 of the S/H stage 106.

Referring to FIG. 6, it is seen that because both nodes of C1 124 are driven only the charge on C2 126 has any effect on the pixel output. Moreover, due to the principal of conservation of charge Qreset_C2=Qsignal_C2, thus:

$$C2 \cdot (-\Delta\text{reset} - Vt\_sf1) = C2 \cdot ((V\text{pix} - \Delta\text{reset} - \Delta V\text{light} - Vt\_sf1) - Vy) \quad \text{(Eq. 6)}$$

where C2 is the capacitance of C2 126, Vpix is the pixel high voltage, reset is the decrease in PD 114 reset voltage following reset due to gate-source crosstalk and KTC noise of the PD, ΔVlight is the decrease in PD 114 voltage following integration due to light incident on the PD, Vt_sf1 is the threshold voltage of the first source follower SF 120) and Vy is the output voltage at node 130 of the S/H stage 106.

This reduces to:

$$Vy = V\text{pix} - \Delta V\text{light} \quad \text{(Eq. 7)}$$

It is noted that the output voltage of the S/H stage 106 depends solely on the change in PD 114 voltage due to electromagnetic radiation 116 (light) and the calibration voltage (Vcalib) coupled to node 130—Vpix in the example described above. Thus, the reset variations (reset) due to KTC noise of the PD 114 and fixed pattern noise (fpn) of the first source follower (SF 120) are cancelled out.

After the signal value has been sampled and the subtraction performed, a R$_{OW}$-S$_{ELECT}$ signal or pulse (Row-Select 212) is applied briefly to the gate of the row-select transistor 138, which closes to couple the output of SF 132 and transfer the voltage at a source of the SF 140 to the column (block 314). The multiple row-select signals (select 212) with the dashed line in between are meant to illustrate a sequential read of pixels in different rows in a single column, as row after row is read out.

Finally, it is noted that the CDS pixel 102 output value on the column 112 will be lower due to a threshold voltage ($V_T$) of the second source follower (SF 132), so the output value on the column will be:

$$V\text{column} = V\text{pix} - \Delta V\text{light} - Vt\_sf2 \tag{Eq. 8}$$

where Vcolumn is the output value on the column, Vpix is the pixel high voltage, $\Delta$Vlight is the decrease in PD 114 voltage following integration due to light incident on the PD, and Vt_sf2 is the threshold voltage of the second source follower (SF 132). In another aspect, the CDS pixel and correlated double sampling method advantageously enables snapshot operation of the image sensor in which substantially all of the pixels in an array operated to capture light or an image thereon at the substantially same time. Briefly, for snapshot mode operation the falling edge of to the sample signal applied to the sample transistor 122 must be at substantially the same, predetermined integration time. As noted previously, this leads to the introduction of additional KTC noise of C1 124, which is expressed in the following equation:

$$V_{noise\_pd\_rms} = \sqrt{\frac{K \cdot T}{C}} \quad C \rightarrow C1 \tag{Eq. 9}$$

where K is Boltzmann's constant (~1.38e-23) in joules per Kelvin, T is the capacitor's absolute temperature in degrees Kelvin, and C1 is the capacitance the C1 124. Together with the KTC noise after reset sampling this additional KTC noise will yield a total KTC noise (rms) of:

$$V_{noise\_rms\_pixel} = \sqrt{\frac{K \cdot T}{C1} + \frac{K \cdot T}{C2}} \tag{Eq. 10}$$

where K is Boltzmann's constant (~1.38e-23) in joules per Kelvin, T is the capacitor's absolute temperature in degrees Kelvin, C1 is the capacitance the C1 124 and C2 is the capacitance the C2 126.

Accordingly, in those embodiments capable of or intended to operate in snapshot mode it is desirable that the capacitances of capacitance-elements C1 124 and C2 126 is significantly larger than that of the capacitance of the PD 114. By significantly larger it is meant on the order of from about 5 to about 10 times the capacitance of the PD, or from about 15 to about 40 fF.

Figure 7:
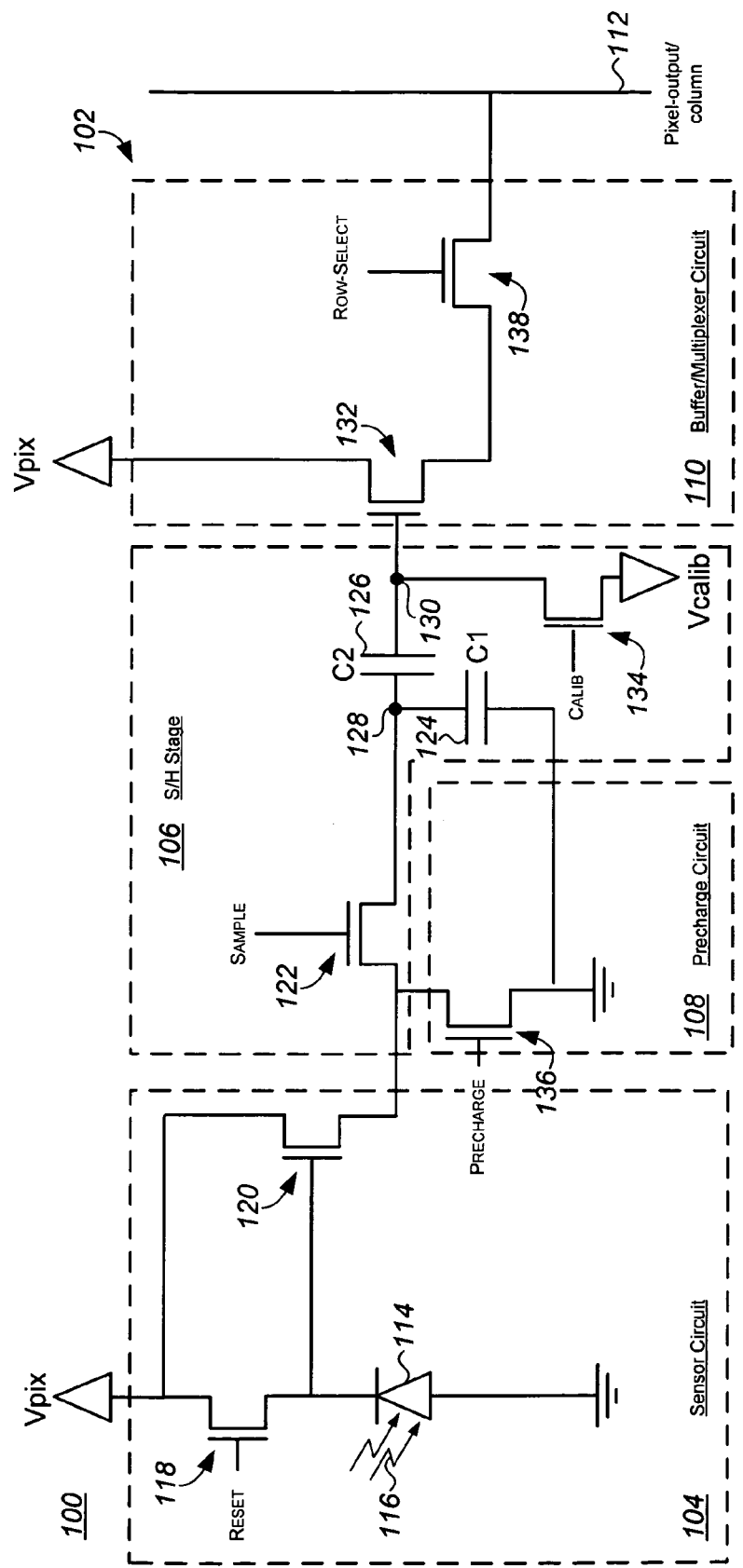
FIG. 7 is a simplified schematic diagram of a portion of an image sensor including a CDS pixel with a separate calibration voltage according to another embodiment.

In an alternative embodiment, shown in FIG. 7, the CDS pixel 102 includes a calibration transistor 132 that is not connected to the pixel high power supply (Vpix) but to a separate high voltage supply line (Vcalib). Optionally, as also shown in FIG. 7, the precharge transistor 136 can be located or coupled before the sample transistor 122 to reduce sample and hold leakage from the capacitance-elements C1 124 and C2 126 through the precharge transistor. Operation of the circuit of FIG. 7 is substantially unchanged from that described above with reference to FIGS. 2 and 3, however it is noted that SAMPLE signal 208 is preferably coupled to the sampling transistor 122 during precharging of the capacitance-elements C1 124 and C2 126.

Figure 8:
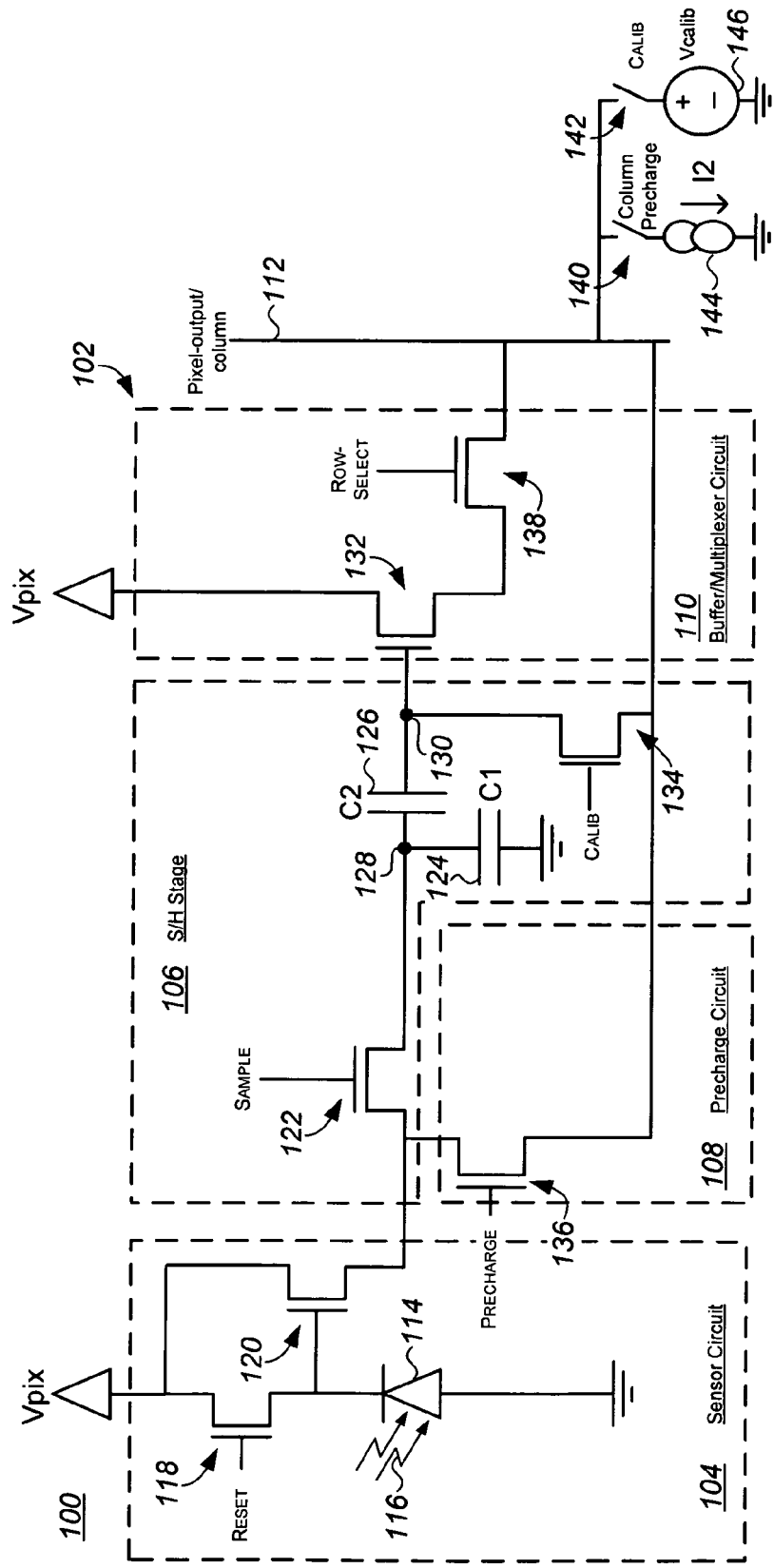
FIG. 8 is a simplified schematic diagram of a portion of an image sensor including a CDS pixel with a precharging and calibration circuit coupled to a pixel output according to yet another embodiment.

In yet another alternative embodiment, shown in FIG. 8, the CDS pixel 102 further includes an in-pixel precharge circuit 108 and S/H stage 106 with a calibration transistor 134 coupled to pixel-output/column 112. Referring to FIG. 8, The image sensor 100 further includes a number of switching-elements 140 and 142 to sequentially couple the column 112 to a column precharge supply 144 or current path (12) and a predetermined, high DC voltage (Vcalib 146) supply respectively. During precharge capacitor-elements C1 124 and C2 126 are coupled through the sample transistor 122 and precharge transistor 136 to the column 140 to precharge the capacitor-elements to a predetermined voltage before the sampling occurs. It will be appreciated that coupling C1 124 and C2 126 to the column 112 for precharging, rather than to an in-pixel ground tap or a separate precharge line decreases a surface area of the pixel taken up with non-light sensitive elements substantially increasing the fill factor of the pixels and the array, thereby increasing the sensitivity of the image sensor 100.

In the embodiment shown in FIG. 8, the precharge transistor 136 is coupled to the precharge current supply 144 through the same column 112 to which the buffer/multiplexer circuit 110 is coupled to readout the sampled signal from the pixel 102. The precharge transistor may alternatively be coupled to any column in the array located near the pixel in which it is included. For example, in other embodiments the precharge transistor 136 can be coupled to a column different from that to which the buffer/multiplexer circuit 110 of the pixel 102 is coupled. The other column can include, for example, the column to which an adjacent pixel located in a different column and possibly a different row in the array is coupled.

Thus, embodiments of a CDS pixel and method for correlated double sampling of the pixel that increases Dynamic Range and fill factor of the image sensor, while decreasing readout time have been described. Although the present disclosure has been described with reference to specific exemplary embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

In the forgoing description, for purposes of explanation, numerous specific details have been set forth in order to provide a thorough understanding of the control system and method of the present disclosure. It will be evident however to one skilled in the art that the present interface device and method may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the control system or method. The appearances of the phrase "one embodiment" in various places in the specification do not necessarily all refer to the same embodiment. The term "to couple" as used herein may include both to directly electrically connect two or more components or elements and to indirectly connect through one or more intervening components.

What is claimed is:

1. A correlated double sampling (CDS) pixel comprising:
    a sensor circuit to generate a voltage value corresponding to electromagnetic radiation received on a photodetector included therein; and
    a sample and hold (S/H) stage including a sample switching-element and first and second capacitor-elements, the first capacitor-element coupled between an output of the sensor circuit through the sample switching-element and a predetermined reference potential, the second capacitor-element having a first node coupled to the output of the sensor circuit through the sample switching-element and a second node coupled in series with an output of the S/H stage, the second node of the second capacitor-element further coupled through a calibration switching element to a calibration voltage (Vcalib) to sample a reset voltage value on the photodetector at a first time ($t_0$) at a beginning of an integration period following reset of the sensor circuit.

2. The CDS pixel according to claim 1, wherein the calibration switching-element decouples the second node of the second capacitor-element from Vcalib to sample a signal voltage value at a second time ($t_1$) during the integration period following reset of the sensor circuit.

3. The CDS pixel according to claim 1, wherein both the reset voltage value and the signal voltage value include reset (KTC) noise of the photodetector, and wherein sampling the signal voltage value subtracts the KTC noise from the signal voltage value stored on the second capacitor-element.

4. A CDS pixel according to claim 3, wherein the sensor circuit further includes a first source follower amplifier (SF) through which the sensor circuit is coupled to the S/H stage, and wherein both the reset voltage value and the signal voltage value include fixed pattern noise (fpn) of the first SF.

5. A CDS pixel according to claim 1, wherein Vcalib is within an order of magnitude of the reset voltage value.

6. A CDS pixel according to claim 1, wherein the photodetector comprises a reverse biased photodiode (PD) coupled between a predetermined reference potential and, through a reset switching-element, to a pixel voltage supply (Vpix).

7. A CDS pixel according to claim 6, wherein Vcalib is substantially the same magnitude as Vpix.

8. A CDS pixel according to claim 1, further including a precharge switching-element coupled to the first and second capacitor-elements through the first node of the second capacitor-element to precharge the first and second capacitor elements to a precharge voltage when the S/H stage is not sampling a voltage value from the photodetector.

9. A CDS pixel according to claim 8, wherein the precharge switching-element is coupled to the predetermined reference potential in parallel with the first capacitor-element.

10. A CDS pixel according to claim 9, wherein the precharge switching-element is coupled in parallel with the first capacitor-element to a precharge voltage applied to a pixel output.

11. An image sensor including an array of a plurality of correlated double sampling (CDS) pixels comprising:
    a sensor circuit to generate a voltage value corresponding to electromagnetic radiation received on a photodetector included therein;
    a sample and hold (S/H) stage including a sample switching-element and first and second capacitor-elements, the first capacitor-element coupled between an output of the sensor circuit through the sample switching-element and a predetermined reference potential, the second capacitor-element having a first node coupled to the output of the sensor circuit through the sample switching-element and a second node coupled in series with an output of the S/H stage, the second node of the second capacitor-element further coupled through a calibration switching-element to a calibration voltage (Vcalib) to sample a reset voltage value on the photodetector at a first time ($t_0$) at a beginning of an integration period following reset of the sensor circuit; and
    a buffer/multiplexer circuit including a row-select switching-element coupled to an output node of the S/H stage to couple a final voltage value (Vy) corresponding to electromagnetic radiation received over the integration period to a column in the array.

12. An image sensor according to claim 11, wherein the calibration switching-element decouples the second node of the second capacitor-element from Vcalib to sample a signal voltage value at a second time ($t_1$) during the integration period following reset of the sensor circuit.

13. An image sensor according to claim 11, wherein the second capacitor-element comprises a capacitor, and wherein the first capacitor-element comprises an intrinsic capacitance between a conducting element of the capacitor and a conducting element of another component in the image sensor.

14. An image sensor according to claim 11, further comprising a precharge switching-element coupled to the first and second capacitor-elements through the second node of the second capacitor-element and the column to precharge the first and second capacitor-elements to a column precharge voltage when the S/H stage is not sampling a voltage value on the photodetector.

15. A method for performing correlated double sampling, comprising:
    providing a pixel, the pixel comprising:
        a sensor circuit having an input, an output, and a photodetector;
        a sample and hold circuit coupled to the output of the sensor circuit, the sample and hold circuit comprising a first capacitor-element having first and second terminals and a second capacitor-element having first and second terminals, the first terminal of the first capacitor-element commonly coupled to the first terminal of the second capacitor-element and to the output of the sensor circuit, and the second terminal of the first capacitor-element coupled for receiving a first source of operating potential; and
        a buffer circuit coupled to the second terminal of the second capacitor element;
    resetting the photodetector in the sensor circuit; and
    coupling the second terminal of the second capacitor-element through a calibration switching-element to a calibration voltage (Vcalib) to sample a reset voltage value on the photodetector at a first time ($t_0$) at a beginning of an integration period following reset of the sensor circuit.

16. A method according to claim 15, further comprising decoupling the second terminal of the second capacitor-element from Vcalib, and sampling a signal voltage value at a second time ($t_1$) during the integration period following reset of the sensor circuit.

17. A method according to claim 16, wherein both the reset voltage value and the signal voltage value include reset (kTC) noise of the photodetector, and wherein sampling the signal voltage value includes subtracting the kTC noise of the photodetector to generate a signal value at the second terminal of the second capacitor where the kTC noise of the photodetector is substantially absent.

18. A method according to claim 17, wherein the sensor circuit further includes a first source follower amplifier (SF) through which the sensor circuit is coupled to the S/H stage and both the reset voltage value and the signal voltage value include fixed pattern noise (fpn) of the first SF.

19. A method according to claim 15, wherein Vcalib is within an order of magnitude of the reset voltage value.

20. A method according to claim 15, further including precharging the first and second capacitor-elements through a precharge switching-element coupled to the first node of the second capacitor-element to precharge the first and second capacitor elements to a precharge voltage when the S/H stage is not sampling a voltage value from the photodetector.

* * * * *